United States Patent [19]

Tewey et al.

[11] 3,922,352

[45] Nov. 25, 1975

[54] JUICY SAUSAGE ANALOG AND PROCESS

[75] Inventors: Robert T. Tewey, Irvington; Sudhakar P. Shanbhag, Tarrytown, both of N.Y.

[73] Assignee: General Foods Corporation, White Plains, N.Y.

[22] Filed: Apr. 1, 1974

[21] Appl. No.: 457,008

[52] U.S. Cl. .................... 426/89; 426/93; 426/574

[51] Int. Cl.[2] ........................ A23J 3/00; A23L 1/04

[58] Field of Search ....... 426/93, 98, 104, 167, 350, 426/364, 89

[56] References Cited

UNITED STATES PATENTS

| | | | |
|---|---|---|---|
| 3,711,291 | 1/1973 | Leidy et al. | 426/167 |
| 3,719,498 | 3/1973 | Leidy et al. | 426/350 |
| 3,719,499 | 3/1973 | Hai et al. | 426/350 |

*Primary Examiner*—James R. Hoffman
*Attorney, Agent, or Firm*—Thaddius J. Carvis; Daniel J. Donovan; Bruno P. Struzzi

[57] ABSTRACT

Disclosed are a juicy sausage analog and its method of preparation. The sausage analog of the present invention has at least three distinct phases: a continuous gel phase, a substantially discontinuous fat phase, and a discontinuous chewy proteinaceous phase. According to the process, solidified fat particles, particles of a chewy proteinaceous component, and a precursor of the continuous gel phase are mixed and coarsely chopped to obtain a substantially uniformly heterogeneous distribution of the particulate material within the continuous gel phase precursor. The resulting coarsely chopped blend is formed into a substantially cohesive sausage analog by coagulating the continuous gel phase precursor.

15 Claims, No Drawings

JUICY SAUSAGE ANALOG AND PROCESS

BACKGROUND OF THE INVENTION

The present invention relates to a juicy sausage analog and a method for preparing the same; more particularly, the present invention relates to a juicy sausage analog prepared primarily from vegetable protein sources but having a heterogeneous, meat-like texture similar to that of pork sausage, and a method for preparing the same.

In recent years, considerable research has focused upon developing new technology for producing meat-like, protein-containing foods from various vegetable and animal protein sources. Economics provides a major incentive. It would clearly be advantageous to substitute the more efficient process of growing vegetable protein for the rather inefficient process by which animals convert the proteinaceous vegetable materials into meat. This is especially true where the ever-increasing human population is feared to be out distancing our ability to provide grazing land for meat-producing animals. Moreover, recent efforts have also been directed to avoiding certain natural products which may be undesirable from religious, ethnic or health reasons.

Boyer, in U.S. Pat. No. 2,682,466, discloses the formation of synthetic meat products containing quantities of vegetable protein filaments. These protein filaments are made by forcing a colloidal protein dispersion through a porous membrane, such as a spinnerette, into a coagulating bath causing precipitation in filament form. The filaments are assembled into a meat-like product by employing binding materials, including cereals and protein.

Anson and Pader, holders of numerous U.S. patents, including U.S. Pat. Nos. 2,802,737; 2,813,024; 2,813,025; 2,830,902; and 2,833,651; disclose protein containing products resembling meat. Integral to their products is the formation of a "chewy protein gel". The chewy protein gel is made by adjusting a gel precursor such as soy or peanut concentrates to a pH of above about 6.0, followed by heating to convert to the chewy protein gel. Various additives including protein filaments, flavoring ingredients, etc., may be incorporated into the synthetic meat products.

Kjelson, in U.S. Pat. No. 3,343,963, teaches the formation of high protein food products resembling chopped ground meats by assembling spun edible protein fibers and binding them with a heat-set mass consisting of albumen, gluten and particulate oil seed material.

Another worker, Hartman, in U.S. Pat. No. 3,320,070 has taught the manufacture of bacon-like products from man-made fibers of coagulated vegetable protein with a binder including albumen and an edible proteinate.

More recently, Leidy, et al. in U.S. Pat. Nos. 3,711,291; 3,713,837; and 3,719,498; and Hai, et al. in U.S. Pat. No. 3,719,499; teach the formation of sausage analogs. In each of these references it is desired to simulate the essentially homogeneous texture of meat-sausage products prepared from meat emulsions.

There is a present need for a juicy sausage analog which more closely simulates the heterogeneous character of many other types of sausages, such as pork sausage.

SUMMARY OF THE INVENTION

Accordingly, it is an object of the present invention to provide a new, juicy sausage analog product and the process for preparing the same, wherein the sausage simulates the texture of a heterogeneous meat-type sausage.

This and other objects are accomplished according to the present invention which provides an improved juicy sausage analog having a heterogeneous texture comprised of at least three distinct phases and a method for preparing the same. The process, in its broad aspects, comprises: (a) providing particles of a solidified fat; (b) providing particles of a chewy proteinaceous component comprising coagulated vegetable protein and from about 20% to about 70% water; (c) providing as a precursor of a continuous gel phase, a uniform blend comprising water and heat coagulable protein; (d) mixing the fat particles, the chewy proteinaceous component particles, and the continuous gel phase precursor sufficiently to blend the ingredients and then coarsely chopping the resulting blend to obtain a substantially uniformly heterogeneous distribution of the particulate material within the continuous gel phase precursor; and (e) forming the resulting coarsely chopped blend into a substantially cohesive sausage analog by coagulating the continuous gel phase precursor.

DETAILED DESCRIPTION

The production of the juicy sausage analog having a heterogeneous texture according to the present invention depends upon the application of several necessary processing techniques to a compositional formulation having several necessary and distinguishing features.

To provide the heterogeneous texture of the sausage analog to make it similar to heterogeneous meat sausages, it is necessary to provide at least three distinct phases: a discontinuous proteinaceous phase, a continuous gel phase, and a substantially discontinuous fat phase. The formulation and utilization of these three phases in the sausage analog product of the present invention and its method of preparation will be described below with specific reference to a pork sausage type analog; however, it is to be understood that analogs of other heterogeneous, meat-containing sausages can be produced according to the present invention.

The continuous gel phase must be one which gels efficiently to provide a cohesive matrix for binding the discontinuous fat and protein phase materials. Additionally, to assure consumer and governmental acceptance of the analog product, it is preferably of high nutritional value. Additionally, the continuous gel phase should preferably contain flavoring materials incorporated therein to provide the desired meat-like flavor consistently throughout. The continuous gel phase should have a chewy meat-like consistency to resemble the texture and mouthfeel of the analogous portion of meat in sausages. The sources of vegetable protein in this phase may be derived from a wide variety of vegetable material as for example, defatted oil seeds, and may include soy, peanuts, cottonseed, peas, etc. The vegetable protein is in concentrated form and is preferably bland; and, in the case of soy, unwanted flavors are removed. Additionally, various animal sources can be employed as a protein source for this phase. Typical of these are whey, blood albumen, sodium caseinate, casein, lactalbumin, collagen, fish protein, and egg protein, especially egg albumen. Preferably, the continuous gel phase will comprise a combination of vegetable and animal protein materials. The most highly preferred combination which has given especially desirable results, is a combination of soy isolate with egg albumen. These materials perform well when employed at a weight ratio of from about 10:1 to about 1:10, preferably about 5:1 to about 1:5, most preferably from about 2:1 to about 1:2.

Most any flavoring material commonly employed in meat or to provide a meat like flavoring can be employed in the continuous gel phase according to the present invention. Prominent among these materials are hydrolyzed vegetable protein, artificial and natural meat flavoring, black pepper, white pepper, coriander, mace, nutmeg, rosemary, sugars, red pepper, sage, salt, monosodiumglutamate, sodiuminosinate, sodium guanylate and the like.

The discontinuous proteinaceous phase has for its purpose the introduction of chewy meat or gristle-like chunks into the sausage analog. These chunks, by their very nature as chewy components, tend to remain in the mouth for extended periods relative to the other ingredients of the sausage. Therefore, it is preferable that these chunks or particles be infused throughout with the necessary flavoring materials to simulate the taste characteristics of meat particles from meat sausages which remain in the mouth in particulate form after the majority of the sausage has been masticated. To provide their necessary texture and mouthfeel the discontinuous proteinaceous phase must necessarily be present as particles of chew, meat-like material. This material can be of a variety of types such as an expanded wheat gluten/soy grit/flour mixture prepared as described in Example I of U.S. Pat. No. 3,719,498; protein granules as described in U.S. Pat. No. 3,102,031; texturized vegetable protein strips prepared as described in U.S. patent application Ser. No. 309,301 filed Nov. 24, 1972; Tofu; Kori Tofu; or spun protein fibers as discussed in U.S. Pat. No. 2,682,466. Preferably, the expanded wheat gluten/soy grit/flour ingredient is employed. This material is typically employed in particulate form at a moisture content of from about 20% to about 70% water, more preferably from about 35% to about 65%. To provide the proper mouthfeel, the particles are coarsely chopped. Preferably these particles will have a size distribution, based on U.S. mesh sizes, allowing a substantial majority to pass through a No. ⅜ sieve and be collected on a No. 40 sieve, more preferably they will pass through a No. 2½ sieve and be collected on a No. 20 sieve. As noted, the particles of the discontinuous protein phase ingredient preferably contain sufficient flavoring materials infused therein to supply a lasting flavoring to the material as it is being chewed. Typical of the flavoring materials and enhancers which can be employed are salt, monosodium glutamate, brown sugar, pepper and other like flavorings.

The juiciness of the sausage analog is critically related, among other things, to the fat content. It is therefore necessary to provide fat of suitable composition and in suitable physical form such that it contributes to the juiciness of the sausage analog without adversely affecting other physical attributes of the sausage, The fat is necessarily one which is solid at normal room temperatures, but which does not melt at such a high temperature that it causes an undesirable coating of the mouth and a resulting greasy taste and mouthfeel in the product. The preferred fats are those which melt no lower than about 70°F and no higher than about 120°F. More preferably, the fats should melt at a temperature within the range of from about 90°F to about 105°F. Typical of the fats which can be employed are rendered and non-rendered animal fats such as lard, suet, tallow and the like. Additionally, many of the hydrogenated vegetable oils, such as those normally employed in whipped toppings, can be employed. For example, coconut oil which has been hydrogenated to have a melting point of from about 90°F to about 100°F is suitable. Further exemplary of vegetable fats which can be employed are hydrogenated cottonseed oil, hydrogenated corn oil, hydrogenated or hydrogenated and fractionated soy bean oil, hydrogenated olive oil, etc. This listing of oils is by no means exhaustive, but merely exemplary of materials which may be readily employed by those skilled in the art. The particular fat is limited only to the use of fats having the proper melting characteristics as noted above which do not adversely affect the other physical characteristics of the sausage. It has been found that the most desirable physical form for the fat in the sausage analog is obtained by reducing the fat in solidified form to obtain substantially discrete particles.

These three separate phase ingredients are combined to provide the juicy sausage analog of the present invention. The fat and discontinuous proteinaceous phases are generally present at weight ratios in the final product of from about 10:1 to about 1:10, preferably from about 5:1 to about 1:5, and most preferably from about 2:1 to about 1:2. The total weight of these two discontinuous phases to the weight of the continuous gel phase in the final product typically falls within the range of from about 10:1 to about 1:10, preferably from about 5:1 to about 1:5, and most preferably from about 2:1 to about 1:2.

According to the broad aspects of the process, the particles of solidified fat and the particles of the chewy proteinaceous component are mixed with the precursor of the continuous gel phase which comprises a uniform blend comprising water, coagulable protein and flavor. The blend of these ingredients may then be coarsely chopped to obtain a substantially uniformly heterogeneous distribution of the particulate material within the continuous proteinaceous phase precursor. This coarsely chopped blend is then preferably heated to coagulate the continuous gel phase precursor sufficiently to form a substantially cohesive sausage analog.

In providing the fat phase particles, the normally solid fat is first melted and a flavoring and/or coloring is optionally added at this point. The fat phase ingredients are then thoroughly blended. The fat is then reduced to substantially discrete particles in solidified form by passing it through a meat grinder or other suitable particulating device. A preferred particulating devide is a Buffalo meat grinder employing a dieplate having 1/16 inch openings therein. The optional flavoring and coloring material can be added to the liquid fat as noted to provide a color and flavor similar to that of natural meat fat. Preferably the fat is colored a light brown color to obscure its identification in the final product as a distinct phase. Thus, although the solid fat will be present in the final product in a substantially discontinuous phase, the sausage will have the appearance of being nearly uniform in color.

The discontinuous proteinaceous phase is prepared for mixing with the other sausage analog ingredients by hydrating it to within the range of from about 20% to about 70% based on its total hydrated weight. Preferably the moisture content will be from about 35% to about 65%. Because it is preferably to have the flavor uniformly present throughout the particles of the discontinuous proteinaceous phase, the hydrating water preferably contains suitable flavoring materials.

In a preferred embodiment of the method of this invention, an expanded high protein constituent containing wheat gluten, soy grits and flour, made in accordance with the procedure of Example I in U.S. Pat. No. 3,719,499 is employed as the discontinuous proteinaceous phase. This expanded protein material is hydrated in an aqueous solution of flavoring materials to a moisture content of from about 20% to about 70% based upon the weight of the hydrated product. The hydrated product is then coarsely chopped in a suitable device such as a Buffalo meat grinder or a Hobart silent cutter. The chopping device is preferably operated to reduce the expanded protein material to particles. Preferably these particles will have a size distribution, based on U.S. mesh sizes, allowing a substantial majority to pass through a No. ⅜ sieve and be collected on a No. 40 sieve, more preferably they will pass through a No. 2½ sieve and be collected on a No. 20 sieve.

The continuous gel phase precursor is prepared by dry blending the dry ingredients which comprise the protein components and flavoring materials and adding water and mixing. The water is preferably added slowly to provide a uniform blend free from lumps of dried material. In a preferred embodiment, dried egg albumen and a soy isolate are mixed at a weight ratio of about 1:1 along with flavoring materials such as hydrolyzed vegetable protein, black pepper, sage, etc., before admixing with an amount of water to obtain a total moisture content for this phase of from about 25% to about 85%, preferably from about 65% to about 75%. The coagulable protein, e.g. the albumen and soy isolate, are generally present in an amount of from about 5% to about 25%, preferably from about 10% to about 15%.

At this point the particulate fat phase ingredient and the particulate protein phase ingredient are preferably mixed with the continuous gel phase precursor in a suitable mixing device such as a Hobart mixer to uniformly blend the ingredients. If desired, the blended ingredients may then be coarsely chopped in a suitable device such as a Buffalo meat grinder having a dieplate with a ⅜ inch orifices therein, to obtain a substantially uniformly heterogeneous distribution of the particulate material within the continuous proteinaceous phase precursor. Also, the fat phase and discontinuous proteinaceous phase particles can be subjected to an initial, similar mixing and chopping sequence before mixing with the continuous gel phase precursor.

The resulting coarsely chopped blend is then ready for heat-setting in any suitable form. Preferably the coarsely chopped blend is formed into sausage links in conventional sausage stuffing apparatus. The sausage casing, typically from about 15 to 24 mm in diameter, can contain a soluble dye or coloring material which will migrate into the sausage analog to provide a cooked meat appearance. It is necessary at this stage in the process to coagulate the continuous gel phase precursor to form a substantially cohesive sausage analog. This is preferably accomplished by use of an autoclave at a temperature within the range of from about 212°F to about 235°F for a time of from about 15 minutes to about 35 minutes. It is possible, of course, to use any other suitable heating means such as micro wave heating, hot air, atmospheric steam, or boiling water. The heating should be sufficient to provide coagulation without significant dehydration. Alternatively, other known coagulation means, such as chemical means, can be employed.

When an inedible casing material has been employed, it is desirable to strip the casing from the analog after heating. The resulting sausage analog is then frozen and packaged for distribution. It is possible to distribute the product in refrigerated form without freezing, however, freezing at the present time appears to offer the greatest economy and effectiveness. More specifically, freezing improves shelf life, flavor and texture.

The following Example is presented for the purpose of further illustrating and explaining the present invention and is not to be taken as limiting in any sense. Unless otherwise indicated, all parts and percentages are by weight.

EXAMPLE I

To form a juicy, pork-sausage-type analog, the following constituents are employed:

| Fat Phase | % |
|---|---|
| Hydrogenated domestic vegetable oil (soy/cottonseed, M.P. 96°F ± 1°F) | 25.83 |
| Imitation sausage flavor | 2.84 |
| **Discontinuous Proteinaceous Phase** | |
| vital wheat gluten | 4.64 |
| wheat flour | 0.98 |
| soy grits | 1.93 |
| ammonium carbonate | 0.05 |
| salt (NaCl) | 1.86 |
| water | 12.14 |
| monosodium glutamate | 0.17 |
| caramel color | 0.17 |
| brown sugar | 1.72 |
| **Continuous Gel Phase** | |
| soy isolate | 5.86 |
| dried egg albumen | 5.51 |
| hydrolyzed vegetable protein | 0.95 |
| black pepper | 0.38 |
| sage | 0.17 |
| water | 34.80 |

The fat phase was prepared by initially melting the fat at elevated temperature followed by cooling to 110°F at which temperature the imitation sausage flavor is added. The flavoring material imparts a sausage flavor and a cooked-meat coloration to the fat upon solidification. After thorough blending of the fat and flavoring, the blend is solidified by cooling to 40°F, and then passed through a Buffalo meat grinder fitted with a die having 1/16 inch orifices therein. The fat is observed (at this point) to be in strands.

The discontinuous proteinaceous phase was prepared from an expanded textured vegetable protein material. This material was prepared by blending 4.64 parts of vital wheat gluten with 0.98 parts of wheat flour, 1.98 parts of soya bits, 0.05 parts of ammonium carbonate, 0.16 parts of salt, and 2.21 parts of water and extruding the resultant blend from a heated Model X-25 Wenger extruder. In the extruder, the blend is subjected to elevated temperature and pressure. The blend is extruded through two ⅜ inch diameter dies with a recorded pressure of about 180 psig and a temperature of approximately 300°F at the die face. The extrudate was dried to a moisture content of about 4%. The dried extrudate was then soaked in an aqueous solution comprising 12.14 parts water, 1.7 parts salt, 0.17 parts monosodium glutamate, 0.17 parts caramel color, and 1.72 parts brown sugar, wherein it is hydrated to a moisture content of about 60%. The resulting hydrated material is then coarsely chopped in a Hobart silent cutter for 90 seconds to provide particles. The coarsely chopped material showed the screen analysis summarized below:

| Mesh Size | Wt. & Retained on Screen |
|---|---|
| ⅜* | 6.4 |
| 2½ | 13.2 |
| 3 | 21.5 |
| 4 | 23.3 |
| 20 | 35.6 |
| Pan | Trace |

*Mostly agglomerates

The continuous gel phase precursor is prepared by dry blending 5.86 parts of the soy isolate with 5.51 parts of the dried egg albumen, 0.95 parts of the hydrolyzed vegetable protein 0.38 parts of black pepper and 0.17 parts of sage. The resulting dry blend is then mixed in a Hobart mixer with 34.8 parts water to form a uniform aqueous continuous gel phase precursor.

The particles of fat, the particles of the discontinuous proteinaceous phase and the continuous gel phase precursor are then mixed for about 3 minutes at medium speed in a Hobart mixer by passing them through a Buffalo meat grinder fitted with a ⅜ inch die, to obtain a substantially uniformly heterogeneous distribution of the particulate material within the continuous proteinaceous phase precursor. The resulting coarsely comminuted blend is then stuffed into 22 mm cellulose sausage casings and tied into 3½ inch links. The stuffed links were then autoclaved at 225°F for 25 minutes to coagulate the continuous gel phase precursor; forming substantially cohesive sausage analogs. The casings were stripped and the sausage analogs were then frozen.

Many modifications and variations of this present invention will be apparent to those skilled in the art upon reading the above disclosure. It is intended that all such modifications and variations be included within the scope of the invention which is defined only by the following claims.

What is claimed is:

1. An improved process for preparing a juicy sausage analog, having a heterogeneous texture comprised of at least three distinct phases which comprises:

a. providing particles of a solidified fat;

b. providing particles of a chewy proteinaceous component comprising coagulated vegetable protein, and from about 20% to about 70% water, by weight;

c. providing as a precursor of a continuous gel phase, a uniform blend comprising water and heat coagulable protein and flavor;

d. mixing the fat particles, the chewy proteinaceous component particles, and the continuous gel phase precursor sufficiently to blend the ingredients and then coarsely chopping the resulting blend to obtain a substantially uniformly heterogeneous distribution of the particulate material within the continuous gel phase precursor; and e. forming the resulting coarsely comminuted blend into a substantially cohesive sausage analog by coagulating the continuous gel phase precursor.

2. A process according to claim 1 wherein the fat has a melting point within the range of from about 70°F to about 120°F.

3. A process according to claim 2 wherein the fat has a melting point within the range of from about 90°F to about 105°F.

4. A process according to claim 2 wherein a flavoring material is added to the fat.

5. A process according to claim 1 wherein the particles of the chewy proteinaceous component are prepared by infusing a dry, fibrous proteinaceous component, comprising vegetable protein with an aqueous solution comprising flavoring to obtain a fibrous, chewy protein component having a moisture content of from about 20% to about 70% by weight.

6. A process according to claim 5 wherein the fibrous, chewy proteinaceous component is coarsely chopped to particles having a size distribution, based on U.S. mesh sizes, allowing a substantial majority to pass through a No. ⅜ sieve and be collected on a No. 40 sieve.

7. A process according to claim 5 wherein the fat has a melting point within the range of from about 70°F to about 120°F, and the solidified fat is reduced to substantially discrete fat particles.

8. A process according to claim 7 wherein the fibrous, chewy proteinaceous component is coarsely chopped to particles having a size distribution, based on U.S. mesh sizes, allowing a substantial majority to pass through a No. ⅜ sieve and be collected on a No. 40 sieve.

9. A process according to claim 1 wherein the precursor of the continuous gel phase is prepared by blending from about 25% to about 80% water with flavoring and from about 5% to about 25% of a heat coagulable protein comprising at least soy isolate and egg albumen at a weight ratio of from about 10:1 to about 1:10, the amounts of flavoring and the protein mixture being expressed on the basis of their dry weights.

10. A process according to claim 9 wherein particles of the chewy proteinaceous component are prepared by infusing a dry, fibrous proteinaceous component, comprising vegetable protein with an aqueous solution comprising flavoring to obtain a fibrous, chewy protein component having a moisture content of from about 20% to about 70% by weight.

11. A process according to claim 10 wherein the fibrous, chewy proteinaceous component is coarsely comminuted to particles having a size distribution, based on U.S. mesh sizes, allowing a substantial majority to pass through a No. ⅜ sieve and be collected on a No. 40 sieve.

12. A process according to claim 11 wherein the fat has a melting point within the range of from about 90°F to about 105°F.

13. A process according to claim 12 wherein the particles of solidified fat additionally comprise flavoring.

14. An improved process for preparing a juicy sausage analog, having a heterogeneous texture comprised of at least three distinct phases, which comprises:

a. providing particles of a solidified fat having a melting point within the range of from about 70°F to about 120°F;

b. providing particles of fibrous, chewy proteinaceous component comprising coagulated vegetable protein, flavor and from about 20% to about 70% water by weight, the fibrous, chewy protein particles having a size distribution, based on U.S.

mesh sizes, allowing a substantial majority to pass through a No. ⅜ sieve and be collected on a No. 40 sieve;

c. providing as a precursor of a continuous gel phase, a uniform blend comprising water, heat coagulable protein and flavor;

d. mixing the fat particles, fibrous, chewy proteinaceous component particles, and the continuous gel phase precursor sufficiently to blend the ingredients and coarsely chopping the resulting blend to obtain a substantially uniformly heterogeneous distribution of the particulate material within the continuous proteinaceous phase precursor; and e. heating the resulting coarsely chopped blend sufficiently to coagulate the continuous gel phase precursor and form a substantially cohesive sausage analog.

15. An improved juicy sausage analog having a heterogeneous texture having at least three distinct phases comprising a continuous gel phase, a discontinuous proteinaceous phase, and a substantially discontinuous fat phase, wherein the continuous gel phase is a coagulated aqueous mixture comprising a heat coagulated protein and flavor; the discontinuous proteinaceous phase is comprised of fibrous, chewy particles comprising a coagulated vegetable protein, flavor, and from about 20% to about 70% water, by weight; and the particles having a size distribution, based on U.S. mesh sizes, allowing a substantial majority to pass through a No. ⅜ sieve and be collected on a No. 40 sieve; and the discontinuous fat phase comprises a fat which melts at a temperature within the range of from 70°F to about 120°F.

* * * * *